(No Model.)

R. W. & F. GRINNELL.
LOCKED JOINT.

No. 277,479. Patented May 15, 1883.

WITNESSES:
C. H. Luther Jr
Wm. L. Cook

INVENTORS
Richard W. Grinnell
Frederick Grinnell
by Joseph A. Miller & Co
Att'ys

UNITED STATES PATENT OFFICE.

RICHARD W. GRINNELL AND FREDERICK GRINNELL, OF PROVIDENCE, RHODE ISLAND; SAID RICHARD W. GRINNELL ASSIGNOR TO SAID FREDERICK GRINNELL.

LOCKED JOINT.

SPECIFICATION forming part of Letters Patent No. 277,479, dated May 15, 1883.

Application filed January 22, 1883. (No model.)

*To all whom it may concern:*

Be it known that we, RICHARD W. GRINNELL and FREDERICK GRINNELL, both of the city and county of Providence, and State of Rhode Island, have invented a new and useful Improvement in Locked Joints; and we do hereby declare the following to be a full, clear, and exact description of the same, reference being had to the accompanying drawings, forming part of this specification.

In the art of protecting buildings against accidental fires automatically the devices used to extinguish the fire, to sound the alarm, to turn on the water, and other devices, are usually secured by jointing two parts and holding them together by a solder fusible at a low temperature. Automatic fire-extinguishers have their valves usually held against the water-pressure by levers, rods, and other devices secured by a solder fusible at a low temperature, and in the various systems for protecting buildings automatically against fire, valves, wires, weights, and other things are held by parts secured together by easily-fusible solder. Solder used for such purposes is largely composed of bismuth, and has but small holding-power, particularly when any appreciable thickness of the solder is used; and when the temperature is raised, not to the melting-point, but above— say 100° Fahrenheit—the parts are liable to move, as the solder is liable to yield. In many cases such yielding destroys the utility of the devices—as, for instance, where a valve in an automatic fire-extinguisher is held to its seat by such a soldered joint and the joint yields the least, then the valve will leak, and the water coming in contact with the soldered joint will prevent the melting of the same when it ought to melt, and thereby prevent the opening of the valve and the action of the automatic fire-extinguisher. To prevent this and firmly lock the joint, so as to relieve the solder from the strain, is the object of this invention.

The invention consists in placing a key or third metallic member into the joint, which takes all the strain, and which key is secured by a fusible solder, as will be more fully set forth hereinafter.

Figure 1:
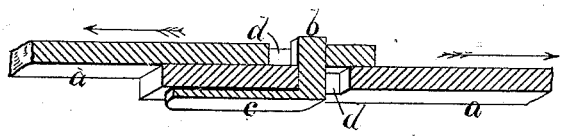
Figure 2:
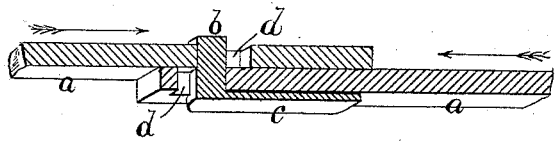
Figure 3:
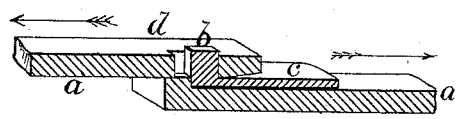
Figure 4:
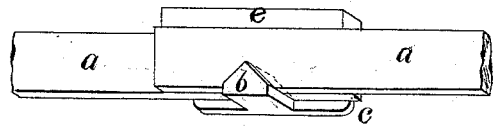

Figure 1 is a sectional view of two parts secured together by a key so as to resist strain. Fig. 2 is a sectional view of two parts secured together by a key constructed to resist thrust. Fig. 3 is a sectional view of a modified form constructed to resist strain. Fig. 4 is a perspective view of a modification in which the key is arranged to resist either strain or compression, and Fig. 5 is a sectional view of the same.

In the drawings, $a\ a$ are two parts of an automatic fire-extinguisher, of a link or any other device that is to resist either compressive or tensile strain, and is to be released in case of a fire by the action of heat on a fusible solder. $b$ is a metal key inserted so as to lock the two parts and retain them in the desired position, thereby interposing a metal locking device on which the parts $a\ a$ exert a shearing strain. The key $b$ is provided with the flange $c$, and this flange is soldered to one of the pieces $a\ a$, to keep the key in place until on the occurrence of a fire the solder melts and releases the key, which is then free to yield to the strain on the parts $a\ a$ and release the same. $d\ d$ are holes made into the parts $a\ a$ to receive the key $b$. These holes are somewhat longer than the width of the key $b$, so that when released the key can tilt and allow the parts to separate.

Figure 5:

The device shown in Figs. 4 and 5 consists of a key having two beveled surfaces, which is inserted into beveled recesses formed in the parts $a\ a$ to lock the same. As soon as the key is released the strain throws it out of the recesses and releases the parts. A lip, $e$, is formed on one of the parts $a$; but when these parts form fixed parts of a device such lip is not required.

It will be seen that all the strain is resisted by the key $b$, and that the parts are securely locked, metal to metal, as long as the key is held in place by the solder. By properly proportioning the parts any amount of resistance can be secured, which cannot have the slightest motion until the key is released, forming a perfectly-locked joint.

Having thus described our invention, we claim as new and desire to secure by Letters Patent—

1. In devices used for protection against fire, the combination, with two parts adapted to resist strain, of a key placed so as to secure the parts together, constructed to be released by the action of heat and permit the parts to separate, as described.

2. The combination, with the parts $a\ a$, of the key $b$, secured by solder, as described.

RICHARD W. GRINNELL.
FREDERICK GRINNELL.

Witnesses:
J. A. MILLER, Jr.,
M. F. BLIGH.